(12) United States Patent
Shikada

(10) Patent No.: US 7,444,437 B2
(45) Date of Patent: Oct. 28, 2008

(54) INPUT/OUTPUT DEVICE AND METHOD OF SETTING UP IDENTIFICATION INFORMATION IN INPUT/OUTPUT DEVICE

(75) Inventor: Hirotaka Shikada, Machida (JP)

(73) Assignee: Fujitsu Limited, Kawasaki (JP)

( * ) Notice: Subject to any disclaimer, the term of this patent is extended or adjusted under 35 U.S.C. 154(b) by 115 days.

(21) Appl. No.: 10/634,749

(22) Filed: Aug. 6, 2003

(65) Prior Publication Data

US 2004/0139241 A1 Jul. 15, 2004

(30) Foreign Application Priority Data

Jan. 14, 2003 (JP) ............................. 2003-006045

(51) Int. Cl.
*G06F 3/00* (2006.01)

(52) U.S. Cl. ..................... 710/9; 710/3; 710/4; 211/26; 312/223.2; 312/223.3; 312/223.4; 312/223.5; 312/223.6

(58) Field of Classification Search ..................... 710/9, 710/3, 4; 211/26; 312/223.2–223.6
See application file for complete search history.

(56) References Cited

U.S. PATENT DOCUMENTS

| | | | | |
|---|---|---|---|---|
| 5,664,221 A | * | 9/1997 | Amberg et al. ................. | 710/9 |
| 5,790,782 A | * | 8/1998 | Martinez et al. ............... | 714/53 |
| 5,835,700 A | * | 11/1998 | Carbonneau et al. .......... | 714/44 |
| 5,838,891 A | * | 11/1998 | Mizuno et al. .................. | 714/5 |
| 5,940,402 A | * | 8/1999 | Krakovyak .................. | 370/461 |
| 6,188,973 B1 | * | 2/2001 | Martinez et al. ............ | 702/188 |
| 2003/0079156 A1 | * | 4/2003 | Sicola et al. ................... | 714/4 |

* cited by examiner

*Primary Examiner*—Niketa I Patel
(74) *Attorney, Agent, or Firm*—Staas & Halsey LLP

(57) ABSTRACT

An input/output device and a method of setting up identification information for an input/output device, to confirm which slot of which device enclosure each unit is mounted in, within a short time, from a map, and execute quick access to the unit. A unit mounted on a device enclosure is assigned a slot identification information that does not overlap with that for another unit in the device enclosure, each device enclosure is assigned device enclosure identification information that does not overlap with that for another device enclosure, and a table is formed using unit identification information, which consists of the slot identification and the device enclosure identification information, and which does not overlap with that for another unit in the device, thus allowing a unit in the device to be specified.

9 Claims, 7 Drawing Sheets

System constitution drawing of the invention

Descriptive drawing (slot ID) of the invention

Flowchart for describing the operation (during the setup) of the invention

Detailed flowchart (for the forming of FC-MAP) of the invention

Example table of the invention (a) Example of SEL table

9 Upper 3 bits

| No. |      | 000 | 001 | 010 | 011 | 100 | 101 | 110 | 111 |
|-----|------|-----|-----|-----|-----|-----|-----|-----|-----|
| 0   | 0000 | 00  | 01  | 02  | 03  | 04  | 05  | 06  | 07  |
| 1   | 0001 | 08  | 09  | 0A  | 0B  | 0C  | 0D  | 0E  | 0F  |
| 2   | 0010 |     | .   |     |     |     |     |     |     |
| 3   | 0011 |     | .   |     |     |     |     |     |     |
| 4   | 0100 |     | .   |     |     |     |     |     |     |
| 5   | 0101 |     | .   |     |     |     |     |     |     |
| .   | .    |     | .   |     |     |     |     |     |     |

Lower 4 bits

10

(b) Example of AL-PA table

| No. | AL-PA value | SEL-ID |
|-----|-------------|--------|
| 1   | EF          | 00     |
| 2   | E8          | 01     |
| 3   | E4          | 02     |
| 4   | E2          | 03     |
| 5   | E1          | 04     |
| 6   | E0          | 05     |
| 7   | DC          | 06     |
| 8   | DA          | 07     |
| 9   | D9          | 08     |
| .   | .           |        |

Fig.6

Example map table of the invention

FC-MAP table 11

| DE | Slot ID (lower 4 bits) | AL-PA value (address) |
|---|---|---|
| 000 | 0000 | EF  ← ③ |
|  | 0001 | D9 |
|  | . | . |
|  | . | . |
|  | . | . |
| 001 | 0000 |  |
|  | 0001 |  |
|  | . | . |
|  | . | . |

Flowchart for describing the operation (during the access) of the invention

INPUT/OUTPUT DEVICE AND METHOD OF SETTING UP IDENTIFICATION INFORMATION IN INPUT/OUTPUT DEVICE

BACKGROUND OF THE INVENTION

1. Field of the Invention

The invention relates to an input/output device comprising: a plurality of device enclosures; a plurality of units that are mounted on said multiple device enclosures; a table indicating a correspondence between an access object device specified by an external device and one of said multiple units; and a control unit that logically connects the external device with the corresponding unit based on said table; and a method of setting up identification information in such an input/output device.

2. Description of the Related Art

A type of device has been available having a rack loaded with a multiple of device enclosures, each of which is mounted with a multiple of hard disk drives ("HDD"). It is so constituted in such a device that a discrete slot identification ("ID") code is assigned to each HDD mounted in each slot, 1 through n, provided in each enclosure, and a map (AL-PA map) is formed based on device enclosures' IDs and slot IDs read from hard disk drives each time when the power in turned on, so that a particular HDD can be accessed referring to said map when it is requested by a host computer.

A control device has also been disclosed, which consists of a plurality of printed circuit boards each equipped with a transmission LSI as an address function to identify which board is located where, and acquires the address of each printed circuit board with the help of said transmission LSI (Document 1).

A technology has also been disclosed wherein a plurality of drive units are connected to each of a plurality of mother boards assigning a discrete serial number to each drive unit, said discrete serial number comprising specific upper bits pre-assigned to each mother board (Document 2).

Document 1) Japanese Utility Model Gazette No. 2570074, especially FIG. 1 and [0006] of that.

Document 2) Japanese Patent Publication No. 04-137258, especially FIG. 1 and the Means of Solving the Problems, Specification of that.

Thus, although the slot ID of an HDD mounted on one of the slots, 1 through n, in a device enclosure can be uniquely defined, it is not unique when other device enclosures are considered, so that it is necessary to form a map obtaining the ID of the particular device enclosure and the slot ID of the HDD mounted in said device enclosure each time when the power is turned on in order to access the particular HDD (a unique address (physical location) corresponding to the HDD) in response to an access request received from the host computer, which causes problems such that it takes a lot of time to form such a map.

The method disclosed by the abovementioned Document 1 also has a problem that it causes a necessity to mount a transmission LSI.

The method disclosed by the abovementioned Document 2 also has a problem that it causes a necessity of presetting discrete serial number of each mother board.

SUMMARY OF THE INVENTION

In order to solve these problems, the present invention intends to set a unique slot ID (e.g., the lower 4 bits) for each unit (e.g., HDD) mounted on a device enclosure and a unique ID (e.g., the upper 3 bits) for each device enclosure each time when the power is turned on, form a map based on the slot ID of the unit after setting, access a particular unit (e.g., HDD) based on said map when an access is requested, and consequently realizing a fast access to a unit (e.g., HDD) by quickly forming a map, checking which slot of which device enclosure the particular unit is located.

The means of solving the problems will be described below referring to FIG. 1.

In FIG. 1, a rack 1 is a rack for storing a control enclosure (CE) 2 and a plurality of device enclosures (DE) 3.

Control enclosure 2 is for providing an overall control for the entire system.

A device enclosure 3 is for carrying a plurality of units, or HDD 4, and comprises HD 4, a back panel (BP) 5, and a port bypass circuit unit (PBCU) 7.

HDD 4 are hard disk drives and an example of the unit.

Back panel (BP) 5 is for carrying a plurality of HDD 4 and holds the first ID (the lower 4 bits which are the fixed value for HDD 4) that constitutes HDD 4 slot ID.

Port bypass circuit unit (PBCU) 7 holds the second ID (e.g., the upper 3 bits) unique to each device enclosure 3.

Next, the actions will be described.

It is constituted in such a way that a plurality of device enclosures 3 are installed in rack 1, a plurality of HDD 4, or units, are mounted on back panel 5 of each device enclosure 3, ID (device enclosure identification information) That represents each device enclosure 3 is set up, and a map (table) is formed after setting up said ID by converting slot ID, which consist of unit identification information (slot identification information) acquired from HDD 4, or units, within each device enclosure 3 and device enclosure identification information, into a physical location or an address to be accessed. A particular unit is accessed based on the map (table) when an access request is received from the host computer (or external device).

The unit identification information (slot identification information) and the device enclosure identification information both expressed in a certain number of bits are combined to form the slot ID.

Therefore, by setting up a unique slot ID (e.g., the lower 4 bits) for each unit, e.g., HDD 4, mounted on a device enclosure 3 and a unique ID (e.g., the upper 3 bit) (or each device enclosure 3 each time when the power is turned on, forming a map (table) based on the slot ID of the unit or HDD 4 after the setting, accessing a particular unit or HDD based on said map when an access is requested, it is possible to realize a fast access to a unit or HDD 4 by quickly forming a map, checking which slot of which device enclosure 3 the particular unit is located.

As can be seen from The above, as a result of constituting the system In such a way as to set up a unique slot ID (e.g., the lower 4 bit) for each unit, e.g., HDD 4, mounted on a device enclosure 3 and a unique ID (e.g., the upper 3 bits) for each device enclosure 3 each time when the power is turned on, form a map based on the slot ID of the unit or HDD 4 after the setting, and access a particular unit or HDD based on said map when an access is requested, it is possible to realize a fast access to a unit or HDD 4 by quickly forming a map, checking which slot of which device enclosure 3 the particular unit is located.

BRIEF DESCRIPTION OF THE DRAWINGS

FIG. 6 is an example map table of the invention.

DETAILED DESCRIPTION OF THE PREFERRED EMBODIMENTS

Next, a preferred embodiment of the invention and its action will be described in sequence referring to FIG. 1 through FIG. 7.

Figure 1:
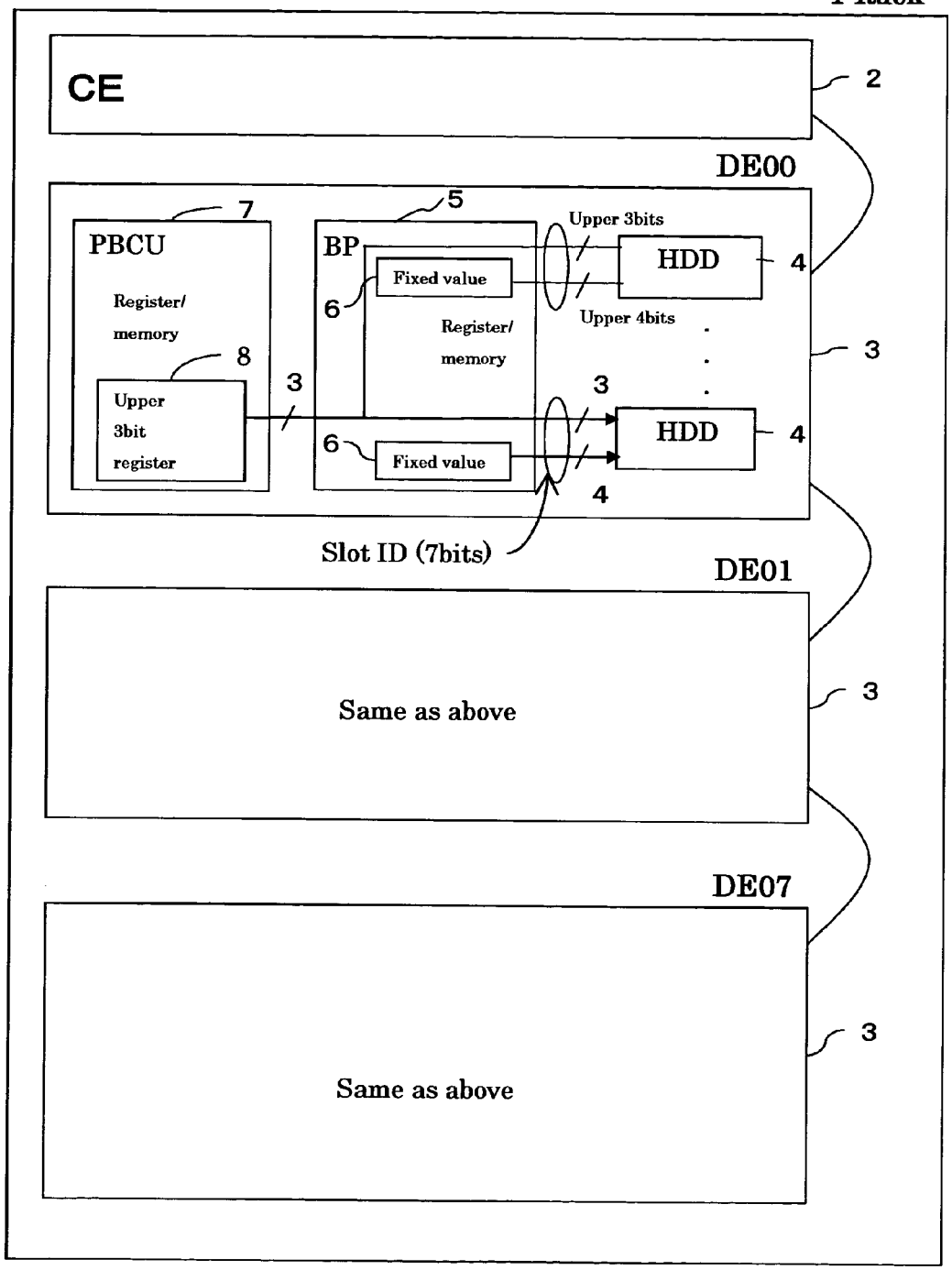
FIG. 1 is a system constitution drawing of the invention.

FIG. 1 shows a system constitutional diagram of a preferred embodiment of the invention.

In FIG. 1, a rack 1 stores a control enclosure ("CE") 2 and a plurality of device enclosures (DE) 3.

Figure 3:
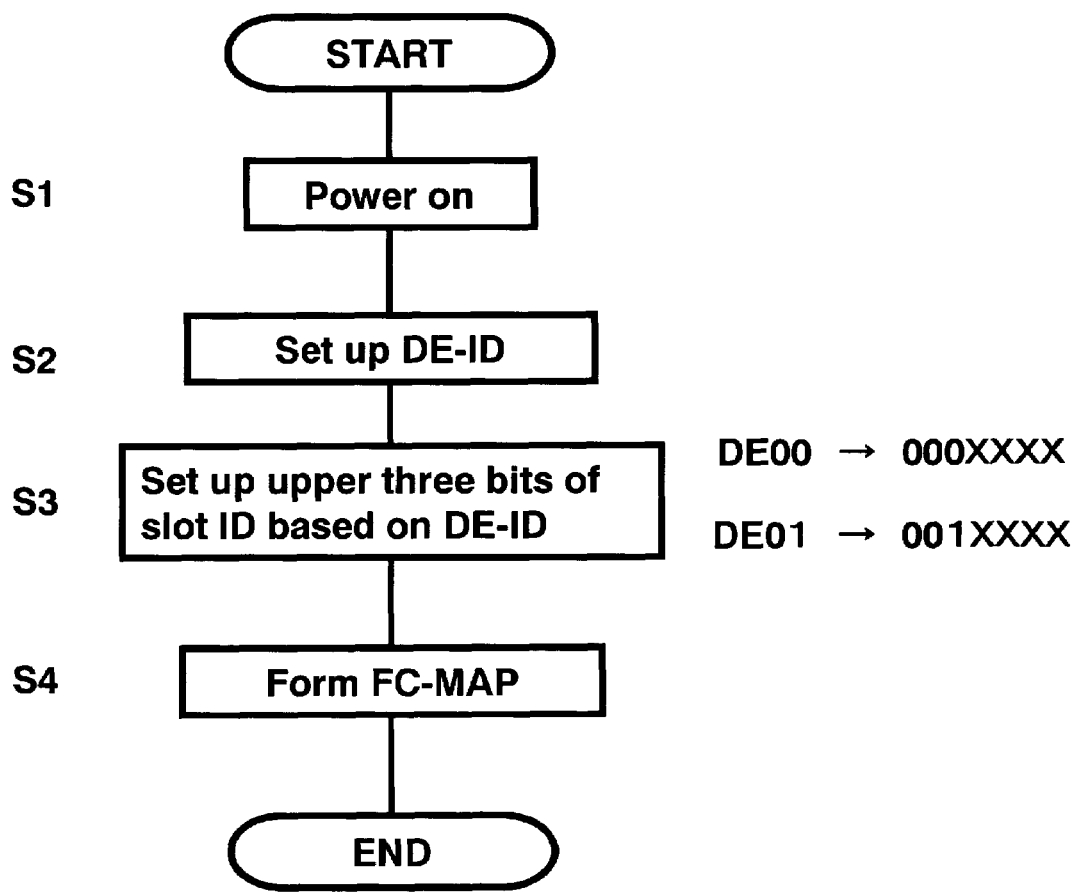
FIG. 3 is a flowchart for describing the operation (during the setup) of the invention.

Control enclosure (CE) 2 provides an overall control of the entire system (refer to FIG. 3, etc.).

Device enclosure 3 is for carrying a plurality of units, or HDD, 4 and comprises, a back panel ("BP") 5, and a port bypass circuit unit ("PBCU") 7.

HDD 4 are hard disk drives and an example of a "unit" in the description).

Back panel (BP) 5 carries (or is connected with) a plurality of HDD 4 and comprises a register/memory 6 for holding the first ID (the lower 4 bits, which are a fixed values, for identifying HDD 4) and constitutes an HDD 4 slot ID.

Port bypass circuit unit (PBCU) 7 comprises a register/memory 8 for holding a unique second ID (e.g., the upper 3 bits) for each device enclosure 3 (refer to FIG. 3 through FIG. 6).

Figure 2:
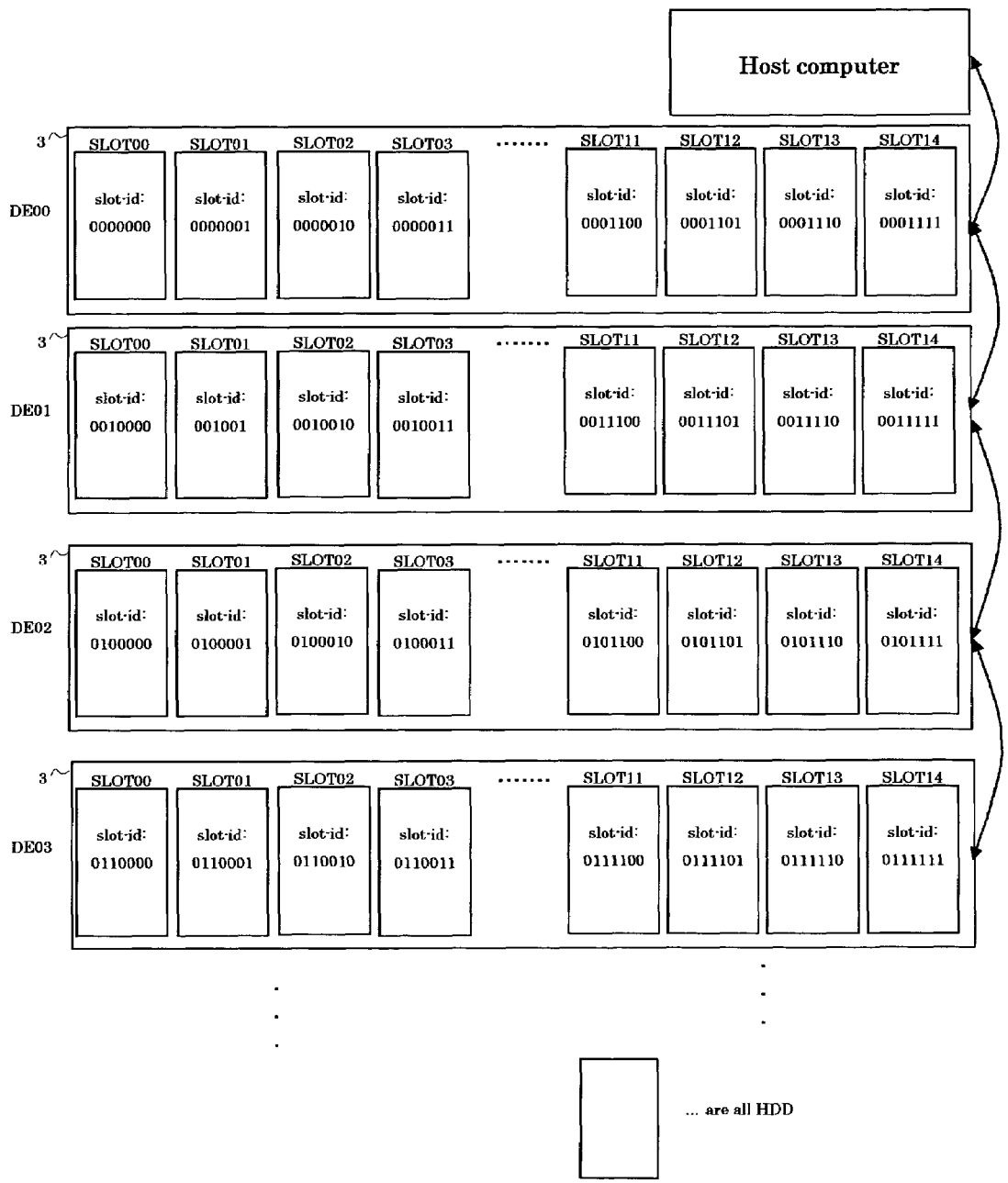
FIG. 2 is a descriptive drawing (slot ID) of the invention.

FIG. 2 shows a system constitutional diagram (i.e., a slot ID diagram) of a preferred embodiment of the invention. This shows that 15 HDD 4 are mounted on each of shelves DE00, DE01, . . . . and a slot ID is set up for each HDD 4, consisting of a first ID (a fixed value for each HDD 4, which consists of the lower 4 bits and is held by register/memory 6) and a second ID (a unique fixed value for each device enclosure 3, which consists of the upper 3 bits and is held by register/memory 8). For example, The slot ID of the HDD 4 first from the left in DE00 (device enclosure's ID =00) =0000000.

The slot ID of the HDD 4 second from the left in DE00=000 0001.

The slot ID of the HDD 4 third from the left in DE00=000 0010.

The slot ID of the HDD 4 fourth from left in DE00=000 0011.

The slot ID of the HDD 4 fifth from the left in DE00=000 0100.

The slot ID of the 15th HDD 4 from the left in DE00=000 0111. The slot ID (7 bits) is set up similarly for shelves DE01, DE02, . . . as shown.

By setting up a unique ID (second ID) for each DE 3 using the upper 3 bits of the 7 bits representing the slot ID of HDD 4 when, for example, the power is turned on and storing (writing) it in register/memory 8 of FIG. 1 as described above, it is possible thereafter to read out the slot ID of HDD 4 consisting of 7 bits, obtain an AL-PA value referencing the table shown in FIG. 5 as described later, set it up in the map (FIG. 6), and access the particular HDD 4 based on said map in correspondence to an access request received from the host computer. This process will be described step by step in the following.

FIG. 3 is a flowchart (at the time of setup) for describing the action of the invention.

In FIG. 3, the power is turned on in the step S1. This turns on power to all devices stored in rack 1 including CE 2, DE 3, etc. in FIG. 1.

In the step S2, DE-ID is set up. In the step S3, the upper 3 bits of the slot ID are set up based on DE-ID. In the steps S2 and S3, the aforementioned CE 2 sets up a unique ID for each DE (device enclosure) 3 on register/memory 8 in each PBCU 7 of DE 3 in FIG. 1, and sets up (writes) DE-ID (e.g., "000" for DE-00) in the upper 3 bits of the slot ID of each HDD 4 in each DE 3. This causes the following, which is also shown on the right side of the flowchart,

DE00→0 0 0 X X X X

DE01→0 0 1 X X X X

. . . .

be set up for the slot ID for each DE 3. The values of the lower 4 bits, which are shown here by X, 0 or 1, can be any four bit values, which represent the fixed values assigned to each HDD 4 (fixed values set up in register/memory 6 shown in FIG. 1).

In the step S4, FC-MAP is formed. This process is to form a map shown in FIG. 6 based on the slot ID established in the step S3 referencing the table shown in FIG. 5 in accordance with the flowchart shown in FIG. 4 to be described later.

Figure 4:
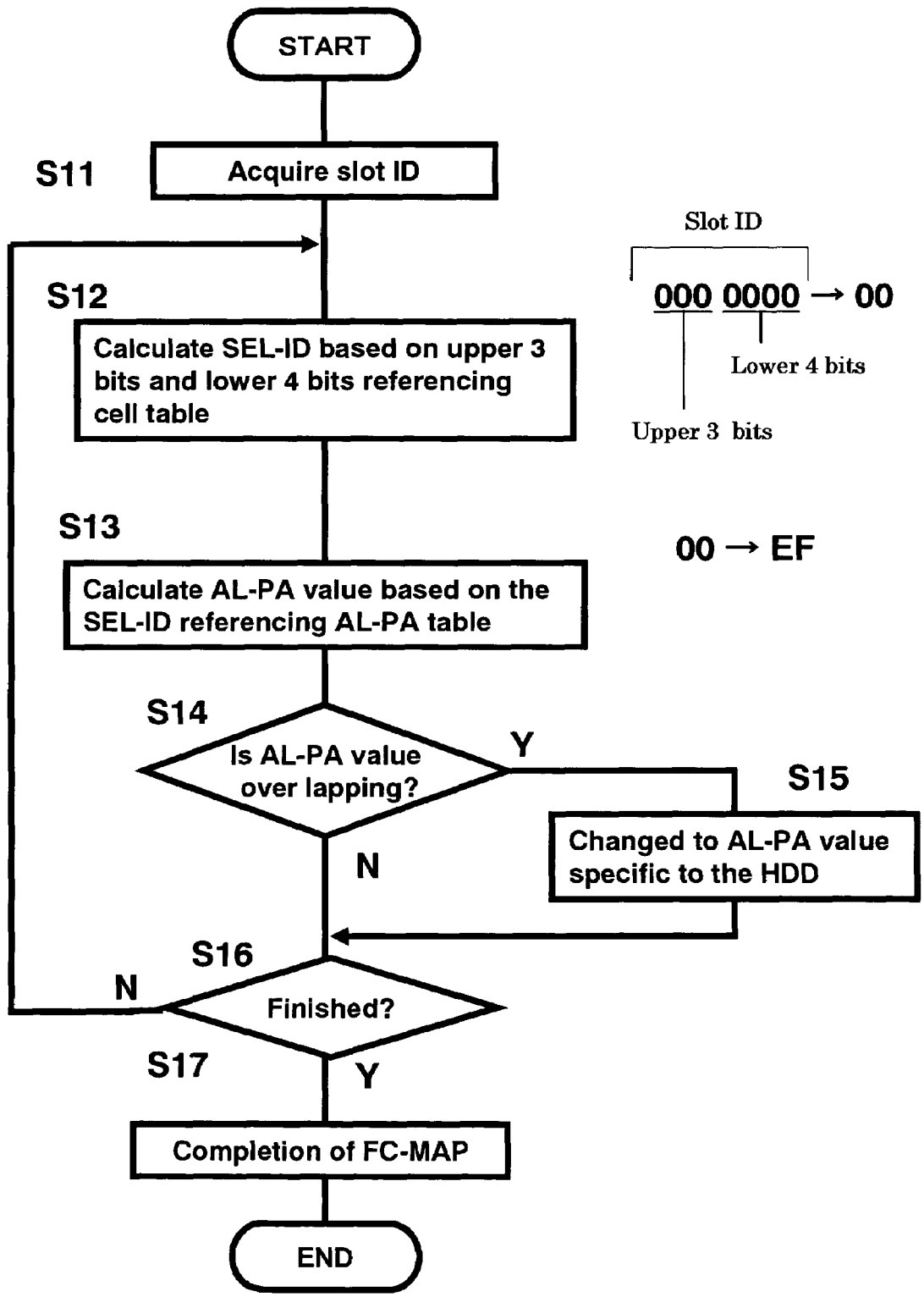
FIG. 4 is a detailed flowchart (for the forming of FC-MAP) of the invention.
Figure 5:
FIG. 5 is an example table of the invention.

This makes it possible to form the map based on the slot ID for each HDD 4 (the upper 3 bits representing the device enclosure's ID and the lower 4 bits representing the particular HDD's ID) referencing the table shown in FIG. 5 (in accordance with the flowchart shown in FIG. 4 to be described later), once an arbitrary value to represent each device enclosure 3 is set up for the upper 3 bits of the slot ID consisting of 7 bits for each HDD 4 in each device enclosure 3.

FIG. 4 is a flowchart (at the time of forming the FCMAP) for describing the details of the invention.

As shown in FIG. 4, the slot ID is acquired in the step S11.

In the step S12, SEL-ID is calculated based on the upper 3 bits and the lower 4 bits referencing the cell table. For example, if a slot ID=000 0000 is acquired from the first HDD from the left in DE00 in the step S11, the value "00", which is marked by ① in (a) SEL table 9 in FIG. 5, is acquired as the SEL-ID based on the upper 3 bits "000" and the lower 4 bits "0000."

In the step S13, the AL-PA value is calculated based on the SEL-ID referencing an AL-PA table 10. For example, the value "EF", which is marked by ②, is calculated as an AL-PA value based on SEL-ID=00 acquired in the step S12 referencing (b) AL-PA table 10 in FIG. 5.

In the step S14, the AL-PA value is judged whether it is overlapping. This is to Judge whether the AL-PA value calculated in the step S13 is overlapping with other AL-PA values already calculated. If the answer is YES, it means it is overlapping, so that it is changed to an AL-PA value unique to the HDD in the step S15 and the program then advances to the step S16. If the answer is NO in the step S14, the program advances to the step S16.

In the step S16, a judgment is made as to whether the steps S11 through S15 have been executed for all HDD slot ID. If the answer is YES, an FC-MAP table is prepared in the step S17 and the process will be terminated. For example, in correspondence with the following, which is shown in the FC-MAP table of FIG. 6:

DE (the upper 3 bits of the slot ID)=0 0 0

Slot ID (the lower 4 bits)=0 0 0 0 the AL-PA value "EF" calculated (or changed in the step S15) in the step S13 is set up.

Thus, it becomes possible to calculate the AL-PA value based on the slot ID acquired from HDD 4 (slot ID consisting of the upper 3 bits and the lower 4 bits) referencing the table shown in FIG. 5 and set it on the map (FC-MAP table shown in FIG. 6). It also becomes possible to access a particular HDD when an access request is received from the host computer based on the AL-PA value (HDD's physical location/address) of said HDD referencing the map (FC-MAP table in FIG. 6).

FIG. 5 shows an example table of the invention.

FIG. 5(*a*) shows an example of SEL table 9. The columns here represent the upper 3 bits of the slot ID, while the rows represent the lower 4 bits of the slot ID. Each cell where a column and a row cross each other represents the SEL-ID in question.

FIG. 5(*b*) shows an example of AL-PA table 10. The SEL-ID value represents the SEL-ID value calculated in (a) SEL table in FIG. 5, and the AL-PA value is the AL-PA value in question (HDD's physical location/address).

It becomes possible to calculate the AL-PA value from the slot ID (the upper 3 bits and the lower 4 bits) acquired from HDD 4 by referencing the above tables.

FIG. 6 shows an example map table 11 of the invention. FC-MAP table 11, which is an example of map table 11, consists of the AL-PA values calculated in correspondence to DE (the upper 3 bits of the slot ID) and the slot ID (the lower 4 bits that correspond to HDD's specific ID) referencing the table shown in FIG. 5. When an access request is received, the AL-PA value for the corresponding HDD can be retrieved referencing the FC-MAP table and an access can be made accordingly.

Figure 7:
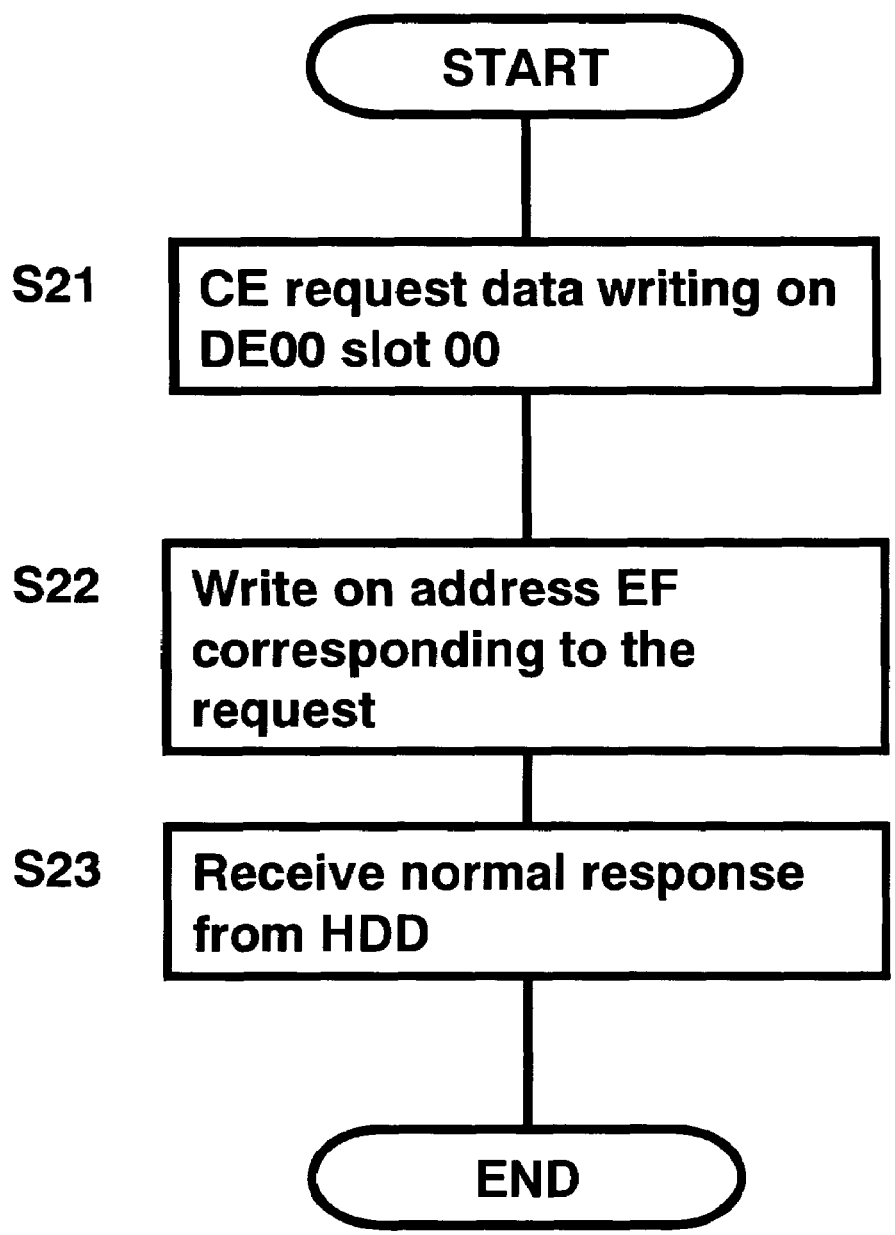
FIG. 7 is a flowchart for describing the operation (during the access) of the invention.

FIG. 7 is a flowchart (at the time of access) for describing the action of the invention.

CE 2 requests writing of data to DE00 slot 00 in the step S21 as shown in FIG. 7.

In the step S22, the data writing into the address EF is executed corresponding to the request. In this process, the AL-PA value=EF marked by ③ in the FC-MAP table shown in FIG. 6 is retrieved concerning the DE00 slot 00 for which the data writing request was made in the step S21, and the data is written into said address EF.

In the step S23, a normal response from the HDD is received.

Thus it is possible to make an access to a corresponding HDD using the corresponding AL-PA value as the address referencing the aforementioned table in FIG. 6 when an access request specifying DE00 slot 00 and the like is received from CE 2.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An input/output device, comprising:
   a plurality of device enclosures;
   a plurality of units mounted on respective ones of said plurality of device enclosures;
   a table indicating a correspondence between an object device, specified by an external device, and a corresponding unit, of said plurality of units; and
   a control unit that logically connects the external device with a specified object unit, based on said table, wherein:
   each unit, mounted on a corresponding one of said plurality of device enclosures, is assigned respective slot identification information that does not overlap slot identification information assigned to another unit within said corresponding device enclosure;
   each said device enclosure is assigned respective device enclosure identification information that does not overlap with device enclosure identification information assigned to another device enclosure and is assigned unique slot identification information based on the assigned device enclosure identification information before each unit is assigned the respective slot identification information, the respective device enclosure identification information being assigned at power-on of the input/output device, and
   said table specifies a unit in a corresponding input/output device, by respective unit identification information, determined by said slot identification information and said device enclosure identification information, which does not overlap respective unit identification information of another unit in the input/output device, the table being formed at power-on of the input/output device after the enclosure identification information is assigned and after the unique slot identification information for each of said device enclosures is assigned,
   wherein each respective unit identification information is a single bit sequence.

2. An input/output device according to claim 1, wherein said slot identification information and said device enclosure identification information are both expressed in respective, certain numbers of bits that are combined to form the single bit sequence of the unit identification information.

3. An input/output device according to claim 1, wherein each said unit is an HDD.

4. A method of setting up identification information in an input/output device comprising a plurality of device enclosures, units that are mounted on respective ones of said plurality of device enclosures, a table indicating a correspondence between an access object device, specified by an external device, and a corresponding unit, of said plurality of units, and
   a control unit that logically connects the external device with the corresponding unit, based on said table, wherein said method comprises:
   assigning, at power-on of the input/output device, to each of said device enclosures corresponding device enclosure identification information that does not overlap with device enclosure identification information assigned to another device enclosure;
   assigning a unique slot identification information for each of said device enclosures based on the assigned corresponding device enclosure identification information;
   assigning to each unit, mounted on one of said plurality of device enclosures, corresponding slot identification information based on the assigning the unique slot identification information for each of said device enclosures and that does not overlap with slot identification information assigned to another unit within said device enclosure;
   forming a plurality of single bit sequences each of which is determined by said corresponding slot identification information and said device enclosure identification information; and
   forming said table, at power-on of the input/output device after the enclosure identification information is assigned and after the unique slot identification information for each of said device enclosures is assigned, so as to specify a unit, in said input/output device, by respective unit identification information, each being a different one of the plurality of single bit sequences, and does not overlap with respective unit identification information of another unit in the input/output device.

5. The method device according to claim 4, further comprising:

expressing said slot identification information and said device enclosure identification information in respective, certain numbers of bits that are combined to form the single bit sequence of the unit identification information.

6. The input/output device according to claim 4 wherein said unit is an HDD.

7. The input/output device according to claim 2, wherein said unit is an HDD.

8. The input/output method according to claim 5, wherein said unit is an HDD.

9. A method of setting up identification information, the method comprising:

assigning a unique slot identification information to each of a plurality of device enclosures at power-on of an input/output device;

assigning, to each unit mounted on respective ones of said plurality of device enclosures, slot identification information based on the assigned unique slot identification information for each of said device enclosures and that does not overlap with slot identification information assigned to another unit within said device enclosure; and forming, a table indicating a correspondence between an access object device, specified by an external device, and a corresponding unit, at power-on of the input/output device after the enclosure identification information is assigned and after the unique slot identification information for each of said device enclosures is assigned, so to specify a unit.

* * * * *

UNITED STATES PATENT AND TRADEMARK OFFICE
CERTIFICATE OF CORRECTION

PATENT NO.         : 7,444,437 B2                                        Page 1 of 1
APPLICATION NO.  : 10/634749
DATED                : October 28, 2008
INVENTOR(S)       : Hirotaka Shikada It is certified that error appears in the above-identified patent and that said Letters Patent is hereby corrected as shown below:

Column 7, Line 19, change "information,the" to --information, the--.

Column 8, Line 12, change "device,and" to --device, and--.

Column 8, Line 13, change "unit,at" to --unit, at--.

Column 8, Lines 16-17, change "assigned,so to" to --assigned, so as to--.

Signed and Sealed this

Seventeenth Day of February, 2009

JOHN DOLL
*Acting Director of the United States Patent and Trademark Office*